United States Patent
Thoen

(10) Patent No.: US 8,103,957 B2
(45) Date of Patent: Jan. 24, 2012

(54) METHODS AND SYSTEMS FOR SIMPLIFYING ACCESS TO VIDEO CONTENT

(75) Inventor: Gregory S. Thoen, Macedon, NY (US)

(73) Assignee: E-LocalLink, Inc., Rochester, NY (US)

( * ) Notice: Subject to any disclaimer, the term of this patent is extended or adjusted under 35 U.S.C. 154(b) by 524 days.

(21) Appl. No.: 11/101,005

(22) Filed: Apr. 7, 2005

(65) Prior Publication Data

US 2005/0267883 A1    Dec. 1, 2005

Related U.S. Application Data

(60) Provisional application No. 60/560,553, filed on Apr. 8, 2004.

(51) Int. Cl.
*G06F 3/00* (2006.01)
*G06F 15/16* (2006.01)

(52) U.S. Cl. ........ 715/733; 715/716; 715/752; 709/203; 709/206

(58) Field of Classification Search .................. 715/745, 715/747, 716, 733, 752; 717/170; 707/203; 709/203, 206
See application file for complete search history.

(56) References Cited

U.S. PATENT DOCUMENTS

| | | | | |
|---|---|---|---|---|
| 6,345,298 B1 * | 2/2002 | Moriya | ......................... | 709/228 |
| 6,594,699 B1 * | 7/2003 | Sahai et al. | ................... | 709/228 |
| 6,973,475 B2 * | 12/2005 | Kenyon et al. | ................ | 709/203 |
| 7,114,160 B2 * | 9/2006 | Suryanarayana et al. | ..... | 719/315 |
| 7,177,938 B2 * | 2/2007 | Sanders | ........................ | 709/228 |
| 7,210,100 B2 * | 4/2007 | Berger et al. | ................. | 715/518 |
| 7,502,834 B2 * | 3/2009 | Ehrich et al. | .................. | 709/217 |
| 7,873,706 B2 * | 1/2011 | Thoen | ............................ | 709/219 |
| 2002/0032752 A1 * | 3/2002 | Gold et al. | ..................... | 709/218 |
| 2002/0056123 A1 * | 5/2002 | Liwerant et al. | ................ | 725/87 |
| 2003/0037327 A1 * | 2/2003 | Cicciarelli et al. | ............ | 717/178 |
| 2003/0065773 A1 * | 4/2003 | Aiba et al. | ..................... | 709/224 |
| 2003/0110234 A1 * | 6/2003 | Egli et al. | ....................... | 709/217 |
| 2004/0019648 A1 * | 1/2004 | Huynh et al. | ................. | 709/206 |
| 2004/0267611 A1 * | 12/2004 | Hoerenz | ......................... | 705/14 |
| 2006/0010435 A1 * | 1/2006 | Jhanwar et al. | ............... | 717/168 |

* cited by examiner

*Primary Examiner* — Ting Lee
(74) *Attorney, Agent, or Firm* — LeClairRyan, a Professional Corporation

(57) ABSTRACT

A method, computer readable medium, and system for simplifying access to content includes requesting content in response to activation of a link associated with the content. Operating environment information about a recipient system is also obtained in response to the activation. One of a plurality of versions of the content for the recipient system is selected based on the obtained operating environment information. The selected version of the content is displayed at the recipient system without user intervention after the activation of the link.

25 Claims, 4 Drawing Sheets

*42* *40*

```
<!DOCTYPE HTML PUBLIC "-//W3C//DTD HTML 4.0 Transitional//EN">
<HTML><HEAD><TITLE>VMAIL</TITLE>
<META http-equiv=Content-Type content="text/html; charset=iso-8859-1">
<META content="MSHTML 6.00.2726.2500" name=GENERATOR></HEAD>
<BODY><B>From:</B> vmailer@elocallink.com<BR><B>Sent:</B> Thursday, March 25,
2004 1:04 PM<BR><B>To:</B> Smith, John<BR><B>Subject:</B> V-Mail Sample from
eLocalLink<BR>
<CENTER> A href="http://www.elocallink.tv/maillink/process8.php?cid=88:/><IMG
height=120 src="http://www.elocallink.tv/maillink/default.gif" width=200
border=0> </A></CENTER></BODY></HTML>
```

VMAIL                                                                 Page 1 of 1

Smith, John
_____

From:     vmailer@elocallink.com
Sent:     Thursday, March 25, 2004 1:04 PM
To:       Smith, John
Subject:  V-Mail Sample from eLocalLink

*52*

You've Got

V-MAIL
Click For Video Message

FIG. 6

METHODS AND SYSTEMS FOR SIMPLIFYING ACCESS TO VIDEO CONTENT

This application claims the benefit of U.S. Provisional Patent Application Ser. No. 60/560,553 filed Apr. 8, 2004, which is hereby incorporated by reference in its entirety.

FIELD

This invention relates generally to network communications and, more particularly, to a method and system for making content, such as video content, accessible to a client system and enabling the client system to receive and play video without requiring any overt operator interaction.

BACKGROUND

Electronic mail ("e-mail") messaging as a communication medium in one form or another has been used since at least the 1970's. For the first two decades of its life, however, e-mail led a somewhat cloistered existence in the halls of academia and the military and among computer enthusiasts. Two subsequent technological innovations, the personal computer and the World Wide Web, had a catalytic effect on this communication medium, causing it to explode into the mainstream. As a result, the use of e-mail as a communication medium has spread throughout the world.

Besides using e-mail for personal communications, e-mail is often used in commercial settings. The speed and interactive nature of e-mail have provided a wonderful communication medium for advertisers and consumers, for example. The multipurpose Internet mail extension ("MIME") standard, currently used by most e-mail applications, allows fairly sophisticated ways of attaching many different types of files to an e-mail message to further expand e-mail's utility. Additionally, e-mail applications are now able to utilize hypertext (e.g., HTML) and active content components (e.g., Java, JavaScript and ActiveX) to provide these applications with additional functionality (e.g., special fonts, color, animations) for conveying information.

With ever more functionality being provided to e-mail applications, the potential for misuse has increased correspondingly. For instance, unsolicited mass e-mailings, otherwise known as "spam e-mail," have wrought havoc on the Internet community. The software industry has responded by developing applications that typically operate on client machines for preventing or blocking spam e-mails sent to the client machine, as well as applications that block "pop-up" advertisements from opening in a client machine's web browser application. Further, it is expected that future versions of Microsoft's Internet Explorer®operating system will incorporate spam and/or pop-up advertisement blocking features. While these applications effectively block spam e-mail and/or pop-up advertisements, they sometimes block legitimate e-mails and/or their attachments, and can prevent other systems from being able to establish legitimate communications with the client machines.

With the proliferation of connections to the Internet by a rapidly growing number of users, the viability of e-mail as a widely accepted medium of communication has increased correspondingly. Internet technology is changing rapidly to cope with ever increasing demands, and the faster the technology changes, the more services users expect from their e-mail applications. For example, users were once satisfied with simple text messages in their e-mail, but now they expect to be able to use the extended functionalities mentioned above that are now available in e-mail. For example, video files (e.g., .wav files) delivered over the Internet to client machines are being used more frequently to convey vast amounts of information more effectively. These video files can easily be attached to e-mail messages sent to the client machines.

However, the size of these video files is typically relatively large compared with other types of files. Consequently, attaching video files to e-mail messages results in clogging e-mail applications and imparting additional traffic on the networks (e.g., Internet) used to transmit the e-mail and accompanying video attachments. Further, the spam blocking applications mentioned above may prevent the e-mail applications on the client machines from accepting legitimate video file attached e-mails and/or the attachments. If the user at the client machine never receives or accesses the video file attachment, then network and client machine resources are wasted unnecessarily. Additionally, when users receive e-mails with video attachments at their client machines, accessing the video attachments and playing the video can be problematic. The video content in the video file attachment must be formatted so that the client machine is able to play the video content using the particular video player application operating on the client machine. The source of the video content must have this information before they can send the video content to the client machine or risk sending video content that the client machine will not be able to play.

Another way of delivering video content to client machines besides attaching video files to e-mails that has become popular is streaming video. With streaming video, lectures or seminars can be broadcasted, announcements can be made, or demonstrations on how to do something can be delivered to users. Streaming video allows users at client machines to access and play video sent over a network as the video is being downloaded by the client machine instead of first sending the entire video file to the client machine, such as an e-mail video file attachment. After a user's client machine spends a few seconds buffering a portion of downloaded streaming video, the machine is able to begin playing the video using a video player installed on the machine. Some of the most popular streaming video players currently being used include Windows Media Player®, Apple Quicktime® and RealVideo®. Streaming video has become so common that most client machines, such as personal computers, have one or more streaming video players already installed when purchased from a retailer.

E-mail can be used to leverage the advantages of delivering streaming video to client machines over a network. For example, a hyperlink may be included in an e-mail message sent to a user at a client machine that indicates the location of some streaming video content that may be downloaded and played by the client machine. As in the case of complete video files that are sent as attachments to e-mails, however, the video content in the streaming video must be formatted so that the client machine can play the video content using the particular video player application operating on the client machine. Further, the streaming video must be formatted to be sent at a particular data transfer rate that the client machine will be able to receive and process the video stream at, otherwise the quality of the video content may be deprecated or the client machine may not even be able to play the video. To ensure the video content is formatted properly, the source of the streaming video must select a version of the video content that is formatted appropriately for the client machine.

As mentioned above, a hyperlink to some video content may be included in an e-mail message sent to a client machine that a user at the machine may select. Selecting this hyperlink may cause a web browser application operating on the client machine to load a particular web page bearing further information relating to accessing the video content. The most common way for the source of the video content to obtain the information necessary for determining the appropriate version of video content to send the client machine is to ask the user a series of questions or provide several drop down menus in the web page regarding the client machine's operating environment.

However, this requires additional effort on the user's part and requires the users to have some knowledge of their machine's operating environment. Users savvy enough to be able to provide their machine's environment information find this process tedious and cumbersome. Some users may not bother to provide the information needed to determine the correct version of the video to send. Other users who are not familiar with their machine's environment information will simply give up trying to download the video rather than spend time trying to obtain this information. Aside from depriving the user from viewing the video, there may be other less obvious but far reaching consequences. For instance, the video may contain advertisements in which case the advertisers lose potential sales. Still further, the spam and pop-up advertisement blocking applications mentioned above may prevent the client machines from communicating with the video source provider to provide the necessary information.

SUMMARY

A method and a computer-readable medium having stored thereon instructions for execution by a processor for simplifying access to content in accordance with embodiments of the present invention includes requesting content in response to activation of a link associated with the content. Operating environment information about a recipient system is also obtained in response to the activation. One of a plurality of versions of the content for the recipient system is selected based on the obtained operating environment information. The selected version of the content is displayed at the recipient system without user intervention after the activation of the link.

A system for simplifying access to content in accordance with embodiments of the present invention includes a recipient system and a processing system. The recipient system requests content in response to activation of a link associated with the content, obtains operating environment information about the recipient system in response to the activation, and displays a selected version of the content without user intervention after the activation of the link. The processing system which is in communication with the recipient system selects the one of a plurality of versions of the content for the recipient system based on the obtained operating environment information.

The present invention offers a number of benefits, such as providing client systems with an easy way to request video content via e-mail messages. The invention is able to generate e-mail messages with references to video content that can be accessed by a variety of e-mail applications that may be operated by the client systems. Once the client systems request the video content via the e-mail message, the invention advantageously instructs the client system to request and operate one or more applications on the client system for playing the video content without requiring any overt interaction by the operator of the client system.

The present invention can provide these benefits because the invention is able to obtain the operating environment information from the client system. The present invention is able to obtain a client system's operating environment information quickly, such as in a matter of seconds. Furthermore, the present invention is scaleable and degrades gracefully because the invention provides the best possible video experience to operators regardless of the client system's processing capacity and network bandwidth speed the system is connected at. Further, the present invention is advantageous since operators do not need to download and install any additional software or update their existing video player to be able to seamlessly request, receive, and play the video.

BRIEF DESCRIPTION OF THE DRAWINGS

FIG. 5 is a portion of exemplary code embodying an exemplary e-mail message used in the system shown in FIG. 1; and FIG. 6 is an exemplary electronic mail message used in the system shown in FIG. 1.

DETAILED DESCRIPTION

Figure 1:
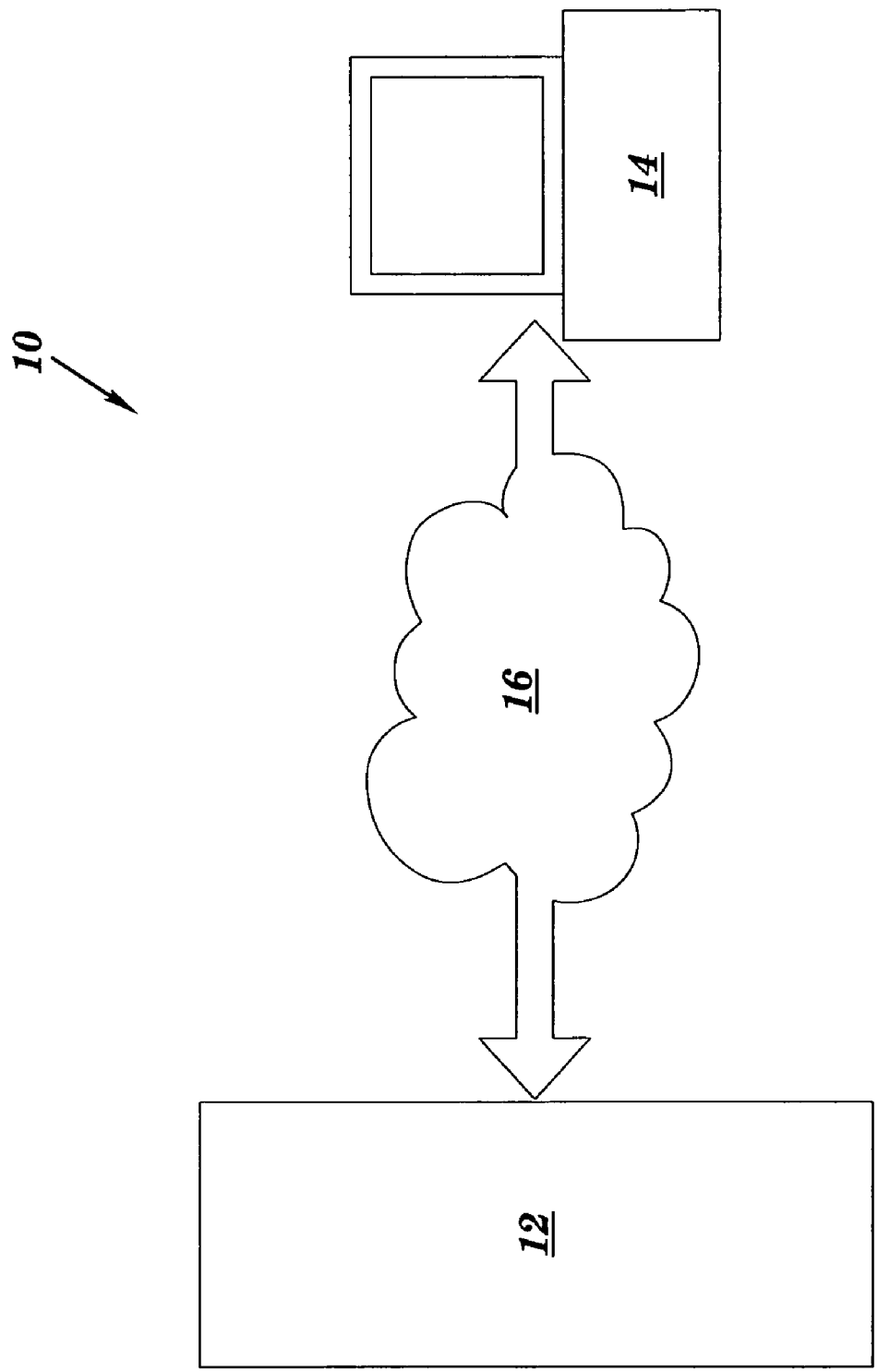
FIG. 1 is a diagram of a system for making video content accessible via e-mail messages in accordance with an embodiment of the present invention.
Figure 4:
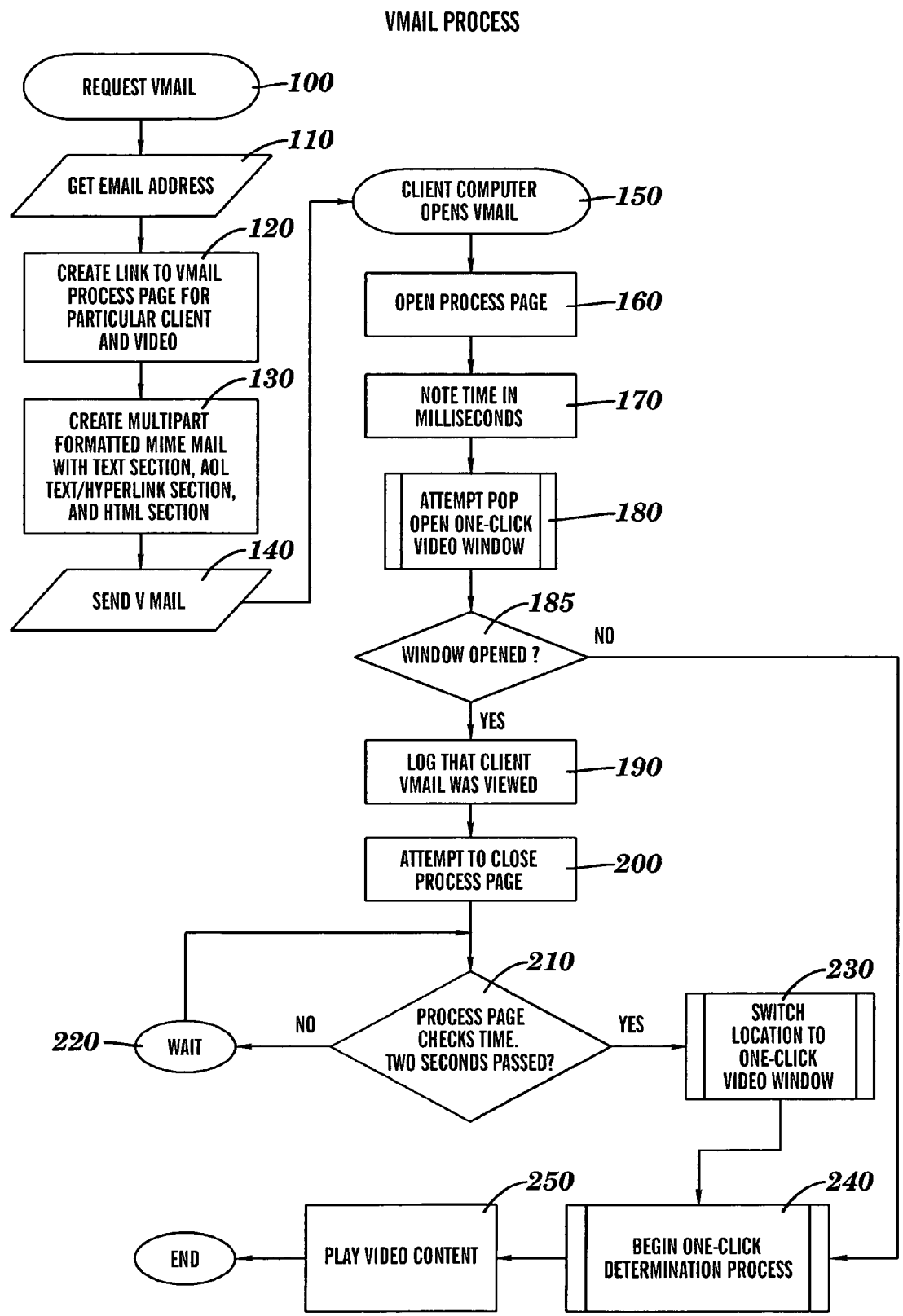
FIG. 4 is a flow chart of a process for making video content accessible via e-mail messages in accordance with another embodiment of the present invention.

A system 10 and method for making video content accessible via e-mail messages in accordance with embodiments of the present invention are generally shown in FIGS. 1 and 4. The system 10 includes a server 12 and a computer 14, although the system 10 can include a lesser or greater number of devices and/or systems. The server 12 sends an e-mail message having a reference to some video content over the network 16 to the computer 14. The computer 14 requests the video content via this e-mail. In response, the server 12 sends one or more web pages to the computer 14 that instruct one or more applications on the computer 14 to request and play the video content sent over the network 16 from the server 12 without requiring any overt interaction from the computer operator.

The system 10 provides a number of benefits, such as making it easy for the operator of the computer 14 to request video content via an e-mail message. The system advantageously generates this e-mail message in a manner that allows a variety of e-mail applications that may be operated by the computer 14 to access it. The system 10 then seamlessly delivers the video content to the computer 14 and relieves the computer operator from having to know, obtain or provide their system's operating environment information before they can receive and play the video content.

Figure 2:
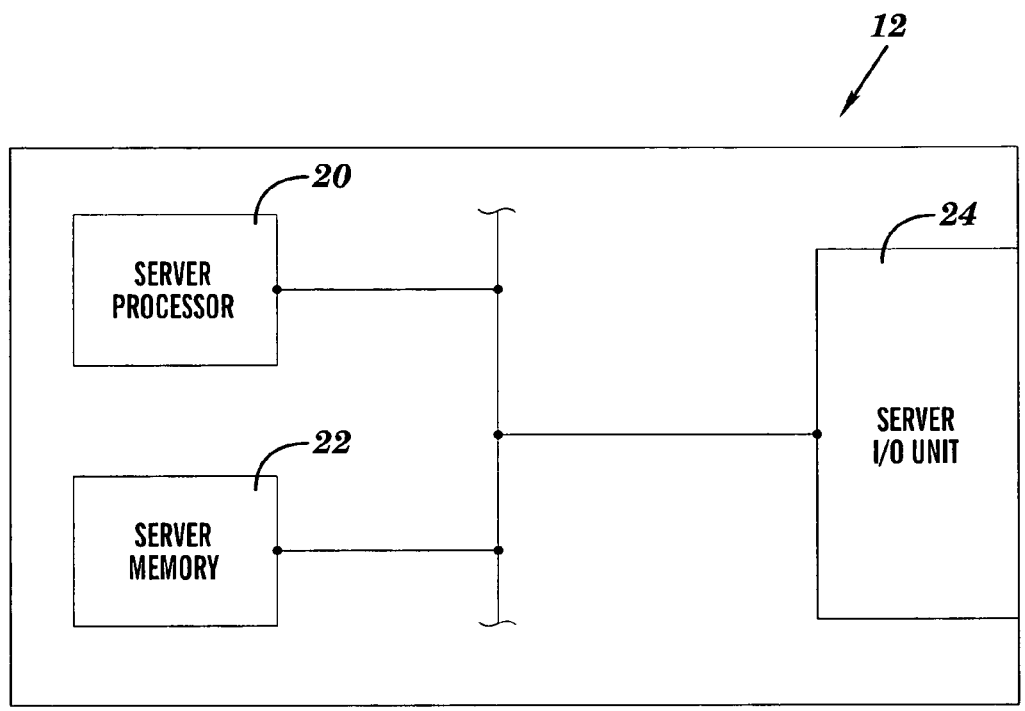
FIG. 2 is a block diagram of a server used in the system shown in FIG. 1.

Referring to FIG. 1, the server 12 and computer 14 are communicatively coupled to each other by the network 16. The server 12 and computer 14 are provided for exemplary purposes only and may comprise other devices, such as laptop computers, personal digital assistants, and cellular telephones. Referring to FIG. 2, the server 12 comprises a server processor 20, a server memory 22 and a server I/O unit 24, all of which are coupled together by one or more bus systems or other communication links, although the server 12 can comprise other elements in other arrangements. The server processor 20 executes instructions stored in the server memory 22 to perform at least a portion of a method for making video content accessible via e-mail messages in accordance with at least one of the embodiments of the present invention as described herein and which is illustrated in FIG. 4, although the server processor 20 may perform other types of functions.

The server memory 22 comprises one or more types of fixed or portable memory accessible by the server processor 20, such as ROM, RAM, SRAM, DRAM, DDRAM, hard and floppy-disks, CDs, DVDs, magnetic tape, optical disk, ferroelectric and ferromagnetic memory, electrically erasable programmable read only memory, flash memory, charge coupled devices, smart cards, or any other type of computer-readable media, which are read from and/or written to by a magnetic, optical, or other reading and/or writing system coupled to the server processor 20 or other processing system. The server memory 22 stores data and instructions which are executed by the server processor 20 to perform at least a portion of the method for making video content accessible via e-mail messages, although the memory 22 may store other data and instructions, and the data and instructions may be stored elsewhere, such as the computer memory 32. The stored instructions are expressed as executable programs written in a number of conventional or later developed programming languages that can be understood and executed by the server processor 20.

The server I/O unit 24 comprises a communication interface that enables the server 12 to transmit data to or receive data from the computer I/O unit 34 in the computer 14 via the network 16, although the unit 24 may comprise other types of communication interfaces and may be able to transmit data to or receive data from other devices.

Figure 3:
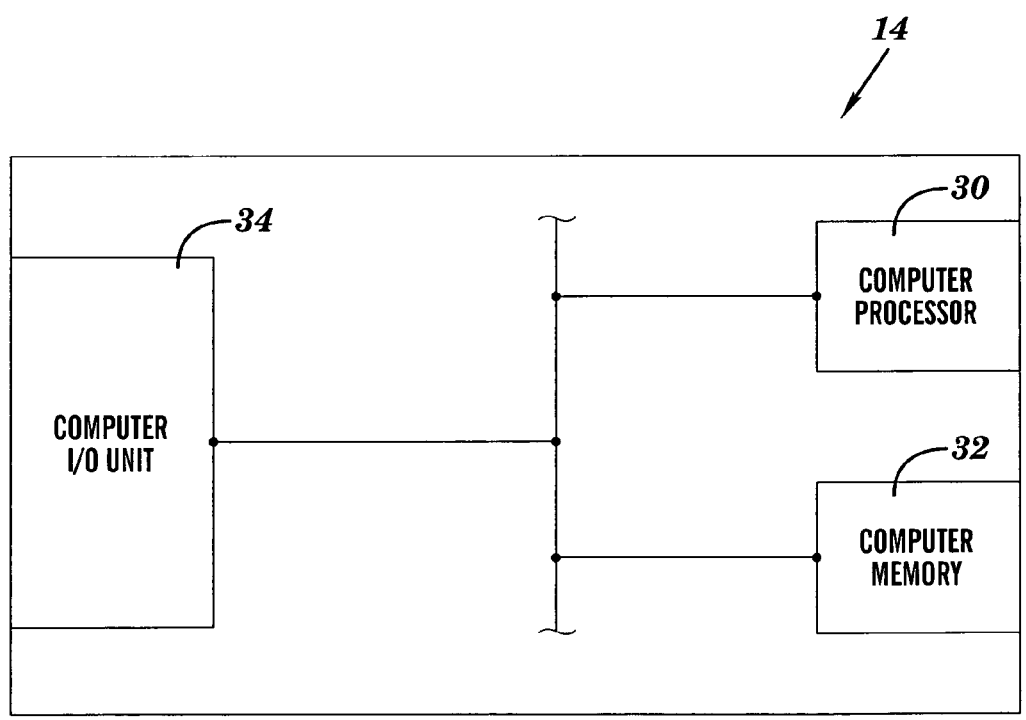
FIG. 3 is a block diagram of a computer used in the system shown in FIG. 1.

Referring to FIG. 3, the computer 14 comprises a computer processor 30, a computer memory 32, a computer I/O unit 34, an input system (not illustrated) and a display system (not illustrated), all of which are coupled together by one or more bus systems or other communication links, although the computer 14 can comprise other elements in other arrangements. The computer processor 30 executes instructions stored in the computer memory 32 to perform at least a portion of the method for making video content accessible via e-mail messages in accordance with at least one of the embodiments of the present invention as described herein and which is illustrated in FIG. 4, although the computer processor 30 may perform other types of functions.

The computer memory 32 comprises the same types of memory storage devices as the server memory 22 in the server 12 (although other types of memory may be used), which is read from and/or written to by a magnetic, optical, or other reading and/or writing system coupled to the computer processor 30 or other processing system. The computer memory 32 stores data and instructions which are executed by the computer processor 30 to perform at least a portion of the method for making video content accessible via e-mail messages, although the memory 32 may store other data and instructions, and the data and instructions may be stored elsewhere, such as the server memory 22. The stored instructions are expressed as executable programs written in a number of conventional or later developed programming languages that can be understood and executed by the computer processor 30.

The computer I/O unit 34 comprises a communication interface that enables the computer 12 to transmit data to or receive data from the server I/O unit 24 in the server 12 via the network 16, although the unit 34 may comprise other types of communication interfaces and may be able to transmit data to or receive data from other devices. The input system of the computer 14 comprises one or more devices, such as a keyboard and/or mouse, which enable an operator to generate and transmit signals or commands to the computer processor 30, although other types of systems may be used. The display system of the computer 14 comprises a computer monitor (e.g., CRT, LCD or plasma display device), which presents video content sent from the server 12 to operators of the computer 14, although other types of display systems may be used and other types of content may be presented.

The network 16 comprises the Internet, although a variety of communication systems and/or methods using appropriate protocols can be used, including serial or parallel bus cables, local area networks, wide area networks, phone lines, coaxial cables, wireless communication technology, and combinations thereof.

A method for making video content accessible via e-mail messages in accordance with embodiments of the present invention will now be described with reference to FIGS. 1-6. At step 100 an operator of the computer 14 uses the computer's input system, in conjunction with operation of the computer processor 30, computer memory 32 and computer I/O unit 34, requests a web page from the server 12. For example, the operator enters a URL in a web browser operated by the computer 14 to request the web page from the server 12, although the page can be found using search engines or in other manners.

The server 12, in conjunction with the operation of the server processor 20, server memory 22 and server I/O unit 24, receives the web page request from the computer 14 and sends the requested web page over the network 16 to the computer 14. This web page is coded using hypertext markup language ("HTML"), although other languages and methodologies may be used, such as YML, XHTML, JavaScript, Java, Perl, Visual Basic, Hypertext Preprocessor scripts ("PHP"), Active Server Page scripts ("ASP"), common gate interface ("CGI") scripts, server side includes, and combinations thereof.

The computer 14 receives the web page and the web browser on the computer 14 interprets the HTML within the code embodying the page to display the web page to the operator using the display system in computer 14, although the web browser may utilize other applications operated by the computer 14 to enable the browser to interpret any other languages embedded in the code embodying the web page. The displayed web page bears one or more button icons, and each icon is a link associated with video content available to be requested for delivery, although other items besides the button icons may be included in the web page, such as text-based hyperlinks.

By way of example only, the operator of the computer 14 selects one of the button icons in the web page to request the server 12 to send an e-mail message associated with the video content corresponding to the computer 14, although the request for the e-mail message may be submitted using other methods, the server 12 may send the e-mail message to the computer 14 without the e-mail message being requested or to other locations which would operate like computer 14 described herein, or the link may be provided in other manners without an e-mail to computer 14. The requested e-mail message, which is hereinafter referred to as "V-mail," provides a way, e.g., hyperlink, for the operator of the computer 14 to request the video content corresponding to the selected icon, although other types of content may be requested via the V-mail, such as audio content, hypertext content or word processing content, and the content may be requested via the V-mail from other sources besides the server 12.

At step 110, by way of example only, the operator of the computer 14 provides the server 12 with one or more e-mail addresses where they would like the V-mail to be sent, although the e-mail addresses may be provided before or at substantially the same time the button icon in the web page is selected at step 100 to request the V-mail. The web page accessed by the computer 14 at step 100 includes one or more fields for accepting the one or more e-mail addresses from the operator of the computer 14, although the operator's e-mail address may be stored at the server memory 22 in the server 12 or elsewhere, or the server 12 may determine the operator's e-mail address information using other methods.

At step 120, the server 12 generates a video process page anchor tag 42, shown in FIG. 5 that provides a reference to a video processing web page that is associated with the video content corresponding to the icon selected by the operator at step 100.

At step 130, the server 12 generates the V-mail requested by the operator of the computer 14 at steps 100-110. Specifically, the server 12 creates a multipart message shown as V-mail code 40 in FIG. 5. The V-mail code 40 is provided for exemplary purposes only and may include a lesser or greater amount of code 40 and other types of code. The V-mail code 40 is in the multipurpose Internet mail extension ("MIME") format, although other formats may be used. The server 12 includes HTML code and text in the V-mail code 40 to form the multipart message, although other languages, methodologies, and combinations thereof, may be used. By formatting the V-mail code 40 in the manner described above, the V-mail code 40 can be accessed, opened, read and interpreted by a plurality of types of e-mail applications that may be operated by the recipients, e.g., computer 14, of the V-mail, such as web-based e-mail reader applications, e.g., Yahoo!®, Hotmail®, America Online® e-mail reader applications, standard MIME e-mail reader applications, and other types of e-mail reader applications. Further, the server 12 includes the video process page anchor tag 42 in the V-mail code 40, which provides the reference to the video processing web page, although the reference to the video processing web page may be included and expressed in other ways or at other locations, e.g., files.

At step 140, the server 12 sends the V-mail generated above at step 130 to the computer 14 over the network 16, although the V-mail could be sent to other systems.

At step 150, the computer 14 receives the V-mail, an example of which is illustrated as V-mail message 50 in FIG. 6, from the server 12, and stores the V-mail message 50 in the computer memory 32 for further processing as described herein. An e-mail reader application operating on the computer 14 opens the V-mail message 50 and displays it to the operator of the computer 14 using the computer's display system. Further, the exemplary V-mail message 50 is based on the portion of exemplary V-mail code 40 shown in FIG. 5. Since the exemplary portion of the V-mail code 40 embodying the exemplary V-mail 50 includes HTML code and text, the particular e-mail reader application on the computer 14 will be able to open and read the V-mail 50.

At step 160, by way of example only, the operator of the computer 14 uses the input system to computer 14 to select the video content icon 52 in the exemplary V-mail message 50 shown in FIG. 6 to request of the associated video content with only one user input, such as with one click of a mouse positioned on the icon 52, although the icon 52 may be selected in other ways, other types of video content or other content may be requested, such as audio content, hypertext content or word processing content, and the content may be requested from other sources besides the server 12 in other manners besides through e-mail, such as through a web browser. The video content icon 52 in the V-mail message 50 corresponds to the video process page anchor tag 42 shown in FIG. 5. In response to the selection of the video content icon 52, the e-mail reader application on the computer 14 launches the web browser on the computer 14, although the browser may already be launched.

Once the web browser is launched, the browser requests from the server 12 the video process web page for the associated video content that is identified by the video process page anchor tag 42, although the process page may be requested from other sources. The server 12 receives the request for the process page and retrieves the video content processing web page from the server memory 22 for further processing by computer 14 as described herein below, although the page may be retrieved from other sources. The video content processing web page is coded using a combination of HTML and JavaScript which is executed by the computer 14 when received, although other languages, other methodologies, and combinations thereof, may be used. The server 12 sends this video content processing web page to the computer 14 over the network 16, although other types of communication methods between computer 14 and server 12 could be used.

The computer 14 receives the video content processing web page and the computer's web browser opens it and begins interpreting or executing the code embodying the page as described herein. However, when the web browser interprets the code, the video content processing web page appears "featureless" in the browser window to the operator of the computer 14. The page appears featureless in that the web browser causes the computer 14 to display a page with just a black background in the web browser window when the web browser interprets the code embodying the page, although the page could appear differently.

The page appears featureless because the instructions in the code that are interpreted by the web browser do not instruct the browser to present any information, e.g., text and/or images, and input from the operator of the computer 14 is not needed, although the instructions in the code could instruct the browser to present information if desired. Further, the blank video content processing web page remains open in the web browser window and visible to the operator for a relatively short amount of time, such as approximately three seconds, although the page may be visible for other amounts of time and this amount of time may vary based on one or more factors, such as the connection speed of the computer 14 to the network 16, the amount of traffic on the network 16, the processing load and speed of the server 12 and/or the computer 14, and other factors.

At step 170, the computer 14 stores an initial or current clock time at the computer memory 32 when the computer 14 requests the video content processing web page from the server 12 at step 160, although other information may be stored, such as date information, and the computer 14 may store the clock time when other events occur, such as when the computer 14 receives all of the code embodying the video content processing web page from the server 12. Additionally, the clock time information is stored as milliseconds, although other increments of time may be used. At step 180, the computer 14 attempts to launch another web browser window.

At step 190, the computer 14 logs that a Vmail was viewed, such as by setting a flag value, e.g., Boolean True or False, to indicate that an e-mail reader application on the computer 14 opened the V-mail sent to the computer 14 at step 140, although other values may be used to indicate the V-mail was read. The computer 14 stores the flag value in the computer memory 32, although the value may be stored elsewhere, such as the server 12. This flag provides an indication that a Vmail message has been viewed and can also provide an indication that there is a stored cookie with information about the operating environment parameters for the computer 14 for viewing a Vmail message which can be retrieved and used.

At step 200, the computer 14 attempts to close the browser window where the video content processing web page sent to the computer 14 at step 160 was opened in. At step 210, the computer 14 determines if two seconds have elapsed since the attempt to close the browser window in which the video content processing web page is open. The computer 14 determines the amount of time which has elapsed after the computer 14 attempted to close the browser window by calculating the amount of time elapsed between the initial clock time stored at step 170 and a current clock time, although other manners for monitoring elapsed time can be used. As in the case of the initial clock time stored at step 170, the current clock time is measured in milliseconds, although other information may be stored, such as date information, and the time may be measured in other increments of time besides milliseconds.

If at step 210 the computer 14 determines that the calculated elapsed amount of time is less than two seconds, then the NO branch is followed to step 220. At step 220, the computer 14 wait for a set amount of time to elapse, such as five milliseconds, before returning to step 210, although the computer 14 may wait other amounts of time.

If at step 210 the computer 14 determines that the calculated elapsed amount of time is equal to or greater than two seconds, then the YES branch is followed to step 230. At step 230, the computer 14 switches to the web browser opened in step 180.

At step 240, the server 12 receives a request from computer 14 for the client environment evaluation web page from either the new web browser opened in step 180 or in the previously opened web browser in which the video content processing web page was opened if the new web browser could not be opened in step 180. The computer 14 receives and executes the code in the client environment evaluation web page which obtains operating environment information for the computer 14 and transmits that information to the server 12. The operating environment information which is obtained from computer 14 identifies a data transfer rate corresponding to the connection speed of the computer 14 over the network 16, identifies one or more types of video player applications that the computer 14 operates, identifies the web browser version on computer 14, and identifies the window or frame size information for the web browser, although the operating environment information may include other types and combinations of information. Based on this operating environment information, the server 12 selects an appropriate version of the video content to send to the computer 14 based on the obtained operating environment information.

At step 250, without further user intervention after the initial user input in step 160, computer 14 requests the video content associated with the V-mail sent to the computer 14 at step 140 from the server 12. To make the request, the browser in the computer 14 sends obtained operating environment information along with the request for the video content to the server 12, such as a database identifier associated with the video content, although other information may be sent to the server 12. The server 12 retrieves the appropriate version of the video content for the computer 14 from the server memory 22 based on the operating environment information obtained during the evaluation and sends the video content to the computer 14 over the network 16 at the appropriate data transfer rate for the computer 14. By way of example only, the different versions of the content may be the same content, but which is provided at a different connection speed or in a different format depending on the viewing application being used.

When the computer 14 receives the video content, the computer 14 launches the identified video player application in the computer 14 to begin playing the video content received from the server 12, such as disclosed in U.S. patent application Ser. No. 10/804,330 to Gregory S. Thoen, entitled "SYSTEM AND METHOD FOR SEAMLESSLY PROVIDING VIDEO CONTENT TO CLIENT SYSTEMS OVER A NETWORK," filed Mar. 19, 2004, which is incorporated by reference herein in its entirety. The computer 14 also automatically configures the display windows used for playing the video content based on instructions from the server 12 obtained based on the evaluation.

It should be appreciated that when the video content is requested by the operator of the computer 14, steps 160-250 are performed and the video is sent to the computer 14 seamlessly without requiring any further interaction by the operator of the computer 14. Further, steps 160-250 are performed quickly, such as in a matter of seconds, regardless of the connection speed of the computer 14 over the network 16. Thus, it is likely that the operator of the computer 14 will not realize that steps 160-250 are being performed to determine the appropriate version of video to send the computer 14.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims.

What is claimed is:

1. A method of simplifying access to content, the method comprising:

obtaining at a video content management server a request for an electronic mail with an embedded link associated with at least one of audio content and viewable content based on activation of a web page link in a web page from a requesting computing device;

providing with the video content management server the electronic mail with the embedded link to the requesting computing device;

obtaining at the video content management server a request for the at least one of audio content and viewable content in response to an activation of the embedded link in an electronic mail;

obtaining with the video content management server operating environment information about the requesting computing device in response to the activation of the embedded link in the electronic mail by opening an initial web browser window in the requesting computing device;

selecting with the video content management sever without user intervention one of a plurality of versions of the at least one of the audio content and viewable content for the requesting computing device based on the obtained operating environment information;

providing with the video content management server the selected version of the at least one of the audio content and viewable content to the requesting computing device; and launching the one of one or more viewing applications identified in the requesting computing device to play the selected version of the at least one of audio content and viewable content received from the video content management server.

2. The method as set forth in claim 1 further comprising creating with the video content management server the electronic mail link associated with the content in the electronic mail before transmission of the electronic mail to the requesting computing device, wherein the electronic mail link provides a reference to a webpage associated with the content.

3. The method as set forth in claim 1 wherein the providing with the video content management server the electronic mail with the embedded link further comprises providing with the video content management server the electronic mail with the embedded link configured to open the one or more viewing applications identified in the requesting computing device in response to the activation of the embedded link in the electronic mail.

4. The method as set forth in claim 1 wherein the initial browser window is substantially featureless until at least the displaying.

5. The method as set forth in claim 1 wherein the obtained operating environment information comprises a connection speed, one or more types of viewing applications, a type of web browser, and a frame size for the type of web browser in the requesting computing device.

6. The method as set forth in claim 5 wherein the selecting is based on at least the connection speed and a selected one of the one or more viewing applications in the obtained operating environment information.

7. The method as set forth in claim 1 wherein the obtaining with the video content management server the operating environment information further comprises determining with the video content management server when the obtained operating environment is stored and obtaining with the video content management server the stored obtained operating environment information for the selecting when the determining determines the obtained operating environment is stored.

8. The method as set forth in claim 1 wherein the viewable content comprises at least one of video content, hypertext content and document content.

9. The method as set forth in claim 1 wherein the embedded link in the electronic mail is not a direct link to the at least one of audio content and viewable content.

10. A non-transitory computer readable medium having stored thereon instructions for simplifying access to content comprising machine executable code which when executed by at least one processor, causes the processor to perform steps comprising:
   obtaining a request for an electronic mail with an embedded link associated with at least one of audio content and viewable content based on activation of a web page link in a web page from a requesting computing device;
   providing the electronic mail with the embedded link to the requesting computing device;
   obtaining a request for the at least one of audio content and viewable content in response to an activation of the embedded link in an electronic mail;
   obtaining operating environment information about the requesting computing device in response to the activation of the embedded link in the electronic email by opening an initial web browser window in the requesting computing device;
   selecting without user intervention one of a plurality of versions of the at least one of the audio content and viewable content for the requesting computing device based on the obtained operating environment information;
   providing the selected version of the at least one of the audio content and viewable content to the requesting computing device; and
   launching one or more viewing applications identified in the requesting computing device to play the selected version of the at least one of audio content and viewable content.

11. The medium as set forth in claim 10 further comprising creating the electronic mail link associated with the content in the electronic mail before transmission of the electronic mail to the requesting computing device, wherein the electronic mail link provides a reference to a web page associated with the content.

12. The medium as set forth in claim 10 wherein the providing the electronic mail with the embedded link further comprises providing the electronic mail with the embedded link configured to open the one of one or more viewing applications identified in the requesting computing device in response to the activation of the embedded link in the electronic mail.

13. The medium as set forth in claim 10 wherein the initial browser window is substantially featureless until at least the displaying.

14. The medium as set forth in claim 10 wherein the obtained operating environment information comprises a connection speed, one or more types of viewing applications, a type of web browser, and a frame size for the type of web browser in the requesting computing device.

15. The medium as set forth in claim 14 wherein the selecting is based on at least the connection speed and a selected one of the one or more viewing applications in the obtained operating environment information.

16. The medium as set forth in claim 10 wherein the obtaining the operating environment information further comprises determining when the obtained operating environment is stored and obtaining with the video content management server the stored obtained operating environment information for the selecting when the determining determines the obtained operating environment is stored.

17. The medium as set forth in claim 10 wherein the viewable content comprises at least one of video content, hypertext content and document content.

18. A content management computing apparatus comprising:
   one or more processors;
   a memory coupled to the one or more processors which are configured to execute programmed instructions stored in the memory comprising:
      obtaining a request for an electronic mail with an embedded link associated with at least one of audio content and viewable content based on activation of a web page link in a web page from a requesting computing device;
      providing the electronic mail with the embedded link to the requesting computing device;
      obtaining a request for the at least one of audio content and viewable content in response to an activation of the embedded link in an electronic mail by opening an initial web browser window in the requesting computing device;
      obtaining operating environment information about the requesting computing device in response to the activation of the embedded link in the electronic email;

selecting without user intervention one of a plurality of versions of the at least one of the audio content and viewable content for the requesting computing device based on the obtained operating environment information;

providing with the video content management server the selected version of the at least one of the audio content and viewable content to the requesting computing device; and launching one or more viewing applications identified in the requesting computing device to play the selected version of the at least one of audio content and viewable content.

19. The apparatus as set forth in claim 18 further comprising creating the electronic mail link associated with the content in the electronic mail before transmission of the electronic mail to the requesting computing device, wherein the electronic mail link provides a reference to a web page associated with the content.

20. The apparatus as set forth in claim 18 wherein the providing the electronic mail with the embedded link further comprises providing the electronic mail with the embedded link configured open the one of one or more viewing applications identified in the requesting computing device in response to the activation of the embedded link in the electronic mail.

21. The apparatus as set forth in claim 18 wherein the initial web browser window is substantially featureless until at least the displaying.

22. The apparatus as set forth in claim 18 wherein the obtained operating environment information comprises a connection speed, one or more types of viewing applications, a type of web browser, and a frame size for the type of web browser in the requesting computing device.

23. The apparatus as set forth in claim 22 wherein the selecting is based on at least the connection speed and a selected one of the one or more viewing applications in the obtained operating environment information.

24. The apparatus as set forth in claim 18 wherein the obtaining the operating environment information further comprises determining when the obtained operating environment is stored and obtaining with the video content management server the stored obtained operating environment information for the selecting when the determining determines the obtained operating environment is stored.

25. The apparatus as set forth in claim 18 wherein the viewable content comprises at least one of video content, hypertext content and document content.

\* \* \* \* \*